(12) United States Patent
Geffard et al.

(10) Patent No.: US 11,872,180 B2
(45) Date of Patent: Jan. 16, 2024

(54) LOWER LIMB OF AN EXOSKELETON WITH LOW POWER CONSUMPTION

(71) Applicant: COMMISSARIAT A L ENERGIE ATOMIQUE ET AUX ENERGIES ALTERNATIVES, Paris (FR)

(72) Inventors: Franck Geffard, Orsay (FR); Dominique Ponsort, Bievres (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 149 days.

(21) Appl. No.: 16/645,274

(22) PCT Filed: Sep. 19, 2018

(86) PCT No.: PCT/EP2018/075396
§ 371 (c)(1),
(2) Date: Mar. 6, 2020

(87) PCT Pub. No.: WO2019/057797
PCT Pub. Date: Mar. 28, 2019

(65) Prior Publication Data
US 2020/0281799 A1    Sep. 10, 2020

(30) Foreign Application Priority Data

Sep. 25, 2017  (FR) ..................................... 1758842

(51) Int. Cl.
*A61H 3/00*  (2006.01)
*A61H 1/02*  (2006.01)
(Continued)

(52) U.S. Cl.
CPC .............. *A61H 3/00* (2013.01); *A61H 1/0262* (2013.01); *B25J 9/0006* (2013.01); *B25J 9/104* (2013.01);
(Continued)

(58) Field of Classification Search
CPC ........................................................ A61H 3/00
See application file for complete search history.

(56) References Cited

U.S. PATENT DOCUMENTS

| 406,328 A | 7/1889 | Yagn |
| 2002/0094919 A1* | 7/2002 | Rennex ................. A63B 25/00 482/124 |

(Continued)

FOREIGN PATENT DOCUMENTS

| FR | 2920951 A1 | 3/2009 |
| WO | 91/00755 A1 | 1/1991 |

(Continued)

OTHER PUBLICATIONS

International Search Report (PCT/ISA/210) dated May 12, 2018, issued by the International Searching Authority in counterpart International Application No. PCT/EP2018/075396.

*Primary Examiner* — Jacqueline Woznicki
(74) *Attorney, Agent, or Firm* — Sughrue Mion, PLLC (57) ABSTRACT

A lower limb (1) of an ambulatory exoskeleton comprising at least a pelvis segment (10). a leg segment (20) and a foot segment (30), the leg segment (20) being hinged at the First end (21) of same to the pelvis segment (10) and at the second end (24) of same to the foot segment (30). the leg segment (20) comprising a spring element (25) and means (40. 44) for varying the distance (d) separating the ends (21. 24) of the leg segment (20), the means (40. 44) for varying the distance (d) separating the ends (21. 24) of the leg segment (20) being carried by the pelvis segment (10).

15 Claims, 10 Drawing Sheets

(51) Int. Cl.
*B25J 9/00* (2006.01)
*B25J 9/10* (2006.01)

(52) U.S. Cl.
CPC .............. *A61H 2201/0192* (2013.01); *A61H 2201/165* (2013.01); *A61H 2201/5064* (2013.01); *A61H 2201/5069* (2013.01)

(56) References Cited

U.S. PATENT DOCUMENTS

| | | | |
|---|---|---|---|
| 2005/0059908 A1 | 3/2005 | Bogert | |
| 2005/0070834 A1* | 3/2005 | Herr | A61F 2/70 |
| | | | 602/28 |
| 2006/0021262 A1* | 2/2006 | Killion | A43B 13/184 |
| | | | 36/136 |
| 2006/0241539 A1* | 10/2006 | Agrawal | A61H 1/024 |
| | | | 602/26 |
| 2013/0023803 A1 | 1/2013 | Hsu et al. | |
| 2014/0121574 A1* | 5/2014 | Chladek | A61N 1/36003 |
| | | | 601/27 |
| 2017/0027735 A1* | 2/2017 | Walsh | A61F 5/0123 |
| 2018/0177670 A1* | 6/2018 | Shim | B25J 9/0006 |
| 2018/0220738 A1* | 8/2018 | Rennex | A43B 3/38 |
| 2018/0326243 A1* | 11/2018 | Badi | A63B 22/02 |

FOREIGN PATENT DOCUMENTS

| | | |
|---|---|---|
| WO | 2012125765 A2 | 9/2012 |
| WO | 2017121971 A1 | 7/2017 |

* cited by examiner

Fig. 11

LOWER LIMB OF AN EXOSKELETON WITH LOW POWER CONSUMPTION

CROSS-REFERENCE TO RELATED APPLICATIONS

This is a National Stage of International Application of PCT/EP2018/075396 filed Sep. 19, 2018, claiming priority based on French Patent Application No. 1758842 filed Sep. 25, 2017. The contents of all of which are incorporated herein by reference in their entirety.

FIELD OF THE INVENTION

The invention relates to the field of exoskeletons and more particularly to the lower limbs of an ambulatory exoskeleton.

BACKGROUND OF THE INVENTION

Traditionally, a lower limb of an ambulatory exoskeleton comprises a pelvis segment, on which a first end of a leg segment is articulated about a hip, and a foot segment, which is articulated, by way of an ankle, on a second end of the leg segment. Control of the lower limb requires at least one actuator for driving the flexion of the leg segment during walking and for taking up the forces applied to the exoskeleton. The forces applied to the exoskeleton may be from several sources: a load applied to the exoskeleton (load-bearing exoskeleton), a partial substitution of the movements of the user (rehabilitation exoskeleton), and, generally, most of the actual weight of the exoskeleton.

Since the leg actuator takes up all of the load itself, it consumes a lot of power, including in static phases. The exoskeleton therefore has to comprise suitably dimensioned means of storing power (hydraulic, thermal or electric), said means impacting on the weight of the exoskeleton and affecting its autonomy and its inertia. Finally, in the event of a power supply failure, the entire mass of the exoskeleton and its possible load will weigh on the user, which may be dangerous to the latter.

OBJECT OF THE INVENTION

An object of the invention is to reduce the power consumption of an ambulatory exoskeleton and to increase safety in the event of a power failure or another software or hardware problem.

SUMMARY OF THE INVENTION

To this end, a lower limb of an ambulatory exoskeleton is provided, comprising at least a pelvis segment, a leg segment and a foot segment, the leg segment being articulated at its first end on the pelvis segment and at its second end on the foot segment, in which the leg segment comprises a spring element for exerting a force that opposes a movement of the ends of the leg segment toward each other, and means for varying the distance separating the ends of the leg segment in order to apply a force counter to that of the spring element, the means for varying said distance being carried by the pelvis segment. The means for varying the distance also comprise a device for pretensioning the spring element.

The spring element takes up the vertical forces applied to the exoskeleton without power consumption, particularly in the static phase when the pretensioning device makes it possible, without power consumption, to maintain tension in the spring element. The variation of the distance separating the ends of the leg segment allows the user to walk with such an exoskeleton without the spring element applying force to the user's foot during the swing phases of the foot.

The invention thus makes it possible to take up a load of unknown mass without the need to parameterize the lower limb, provided that this mass is less than the pretensioning force.

A particularly simple embodiment is obtained when the means for varying the distance separating the ends of the leg segment comprise a cable, which will advantageously be able to extend between the pelvis segment and the foot segment. The configuration is further simplified when the spring element is a leaf spring, it being possible for the leaf spring to perform the dual function of a spring element and of a structural component. The leaf spring can be positioned behind or in front of the leg of a user wearing the exoskeleton.

Advantageously, the means for varying the distance separating the ends of the leg segment comprise a geared motor and a winding pulley for winding and unwinding the cable.

According to a particular embodiment, the means for varying the distance separating the ends of the leg segment are controlled by a foot position sensor situated on the foot segment of the exoskeleton. According to an advantageous alternative, the sensor for detecting an intention to walk is situated on the ankle articulation located between the leg segment and the foot segment.

The variation of the distance separating the ends of the leg segment can then be directly controlled on the basis of the measurement output by this sensor, thus ensuring that the foot follows the leg of the user in the swing phase.

Other features and advantages of the invention will become clear from reading the following description of particular non-limiting embodiments of the invention.

BRIEF DESCRIPTION OF THE DRAWINGS

Reference will be made to the accompanying figures, in which.

DETAILED DESCRIPTION OF THE INVENTION

Figure 1:
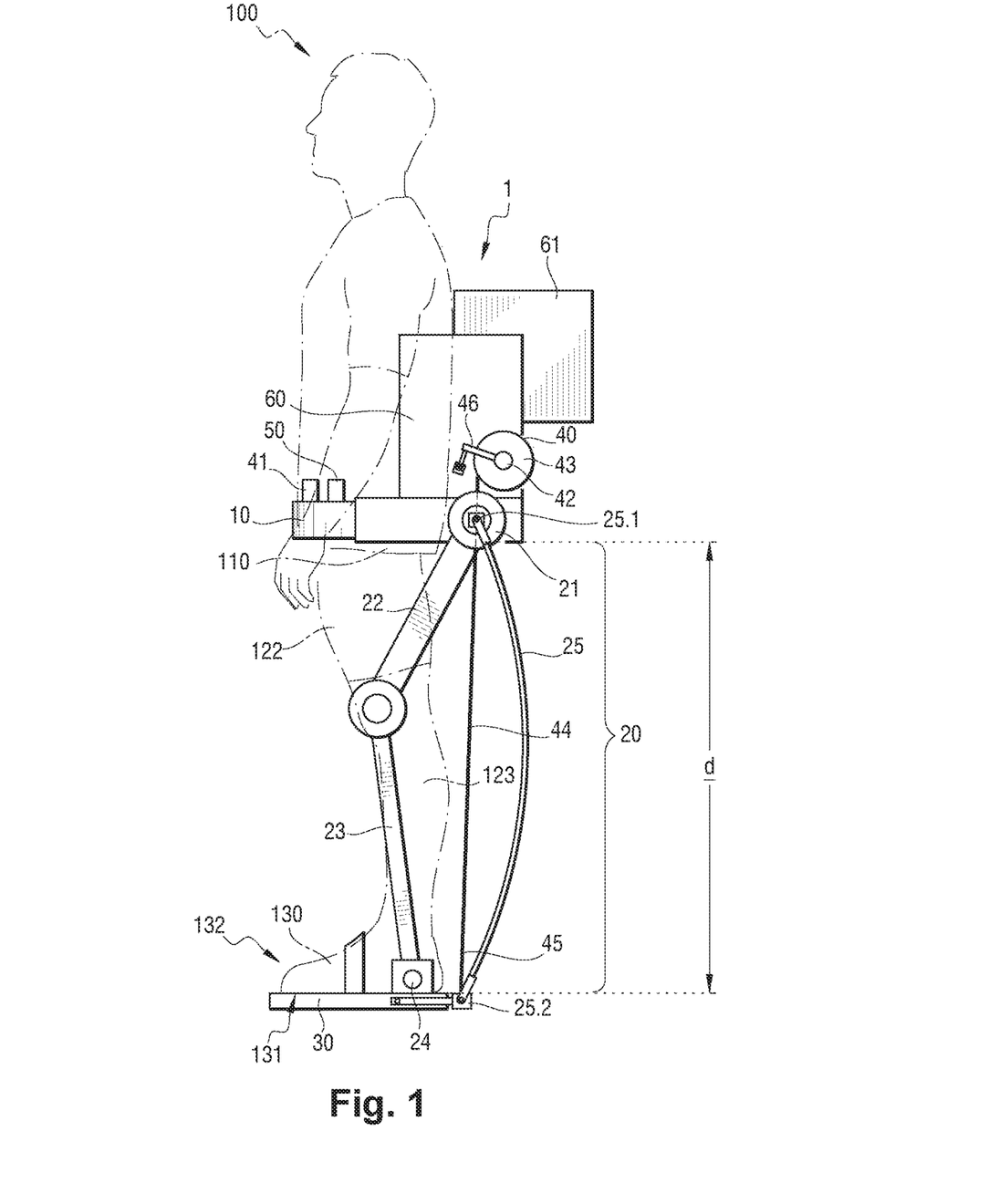
FIG. 1 is a schematic profile view of a user wearing a first embodiment of the lower-limb exoskeleton according to the invention.
Figure 2:
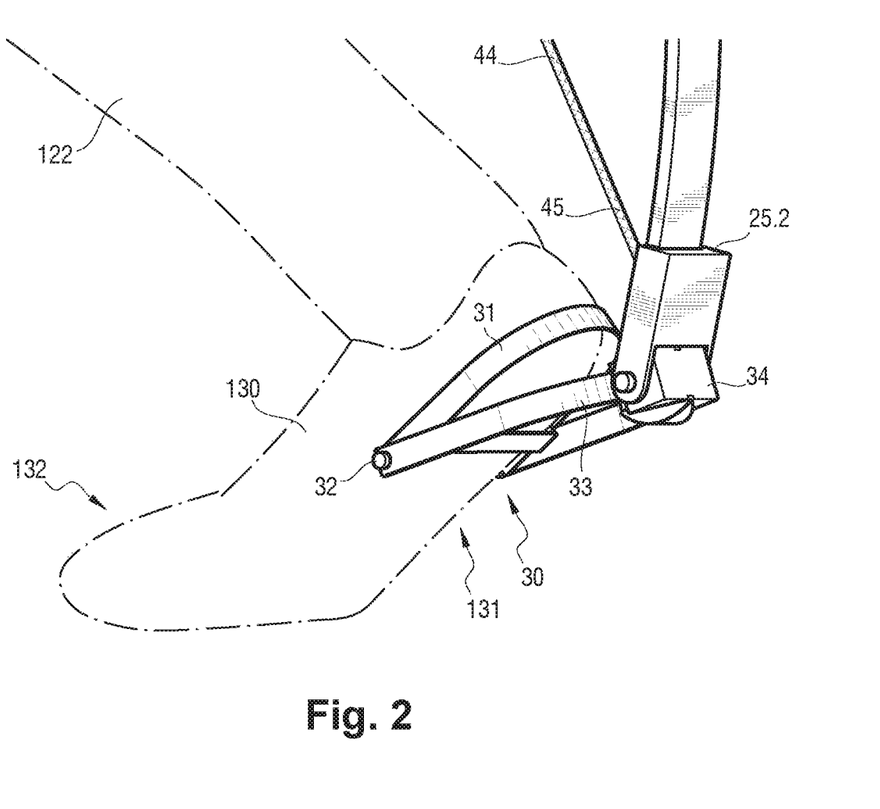
FIG. 2 is a schematic perspective view showing details of the exoskeleton according to the invention.

With reference to FIGS. 1 and 2, the lower limb of an ambulatory exoskeleton, generally designated 1, is worn by a user 100. The lower limb 1 comprises a pelvis segment 10 on which is articulated the first end 21 of a leg segment 20 comprising a thigh segment 22, articulated on a tibia segment 23, and a foot segment 30. The foot segment 30 is articulated on the tibia segment 22 at a second end 24 of the leg segment 20. The pelvis segment 10 and the foot segment 30 are connected respectively to the pelvis 110 and the foot 130 of the user 100 by straps. Optionally, the thigh segment 22 and tibia segment 23 can be connected respectively to the thigh 122 and the tibia 123 of the leg 120 of the user 100 by straps.

The leg segment 20 comprises a leaf spring 25, which extends behind the leg segment 20 and of which a first end 25.1 is articulated on the pelvis segment 10 and a second end 25.2 is articulated on the foot segment 30. The pelvis segment 10 carries an electric geared motor 40, which is powered by accumulators 41 and of which the output shaft 42 carries a winding pulley 43. A cable 44 extends between the foot segment 30 and the winding pulley 43. More precisely, a first end 45 of the cable 44 is connected to the second end 25.2 of the leaf spring 25.

As can be seen in FIG. 2, the foot segment 30 is coincident here with the sole 131 of the shoe 132 of the user 100 and comprises a first element 31 of foot segment 30 that is rigidly connected to the foot 130 of the user and that is articulated by a hinge 32 on a second element 33 of foot segment 30. The second element 33 is substantially in the shape of a horseshoe and extends around the heel of the user. The second element 33 is itself articulated on the end 25.2 of the leaf spring 25. A rotary encoder 34, here a rotary potentiometer, measures the relative angular position of the second element 33 of foot segment 30 and the leaf spring 25. From this angular position it is possible to deduce the attitude (estimation of the length) of the leg 122, hence the distance separating the pelvis segment 10 from the foot segment 30. Controlling the distance d on the basis of this angular position makes it possible to follow the foot of the user 100 when the leg 122 is in the swing phase (lifted from the ground).

Figure 3:
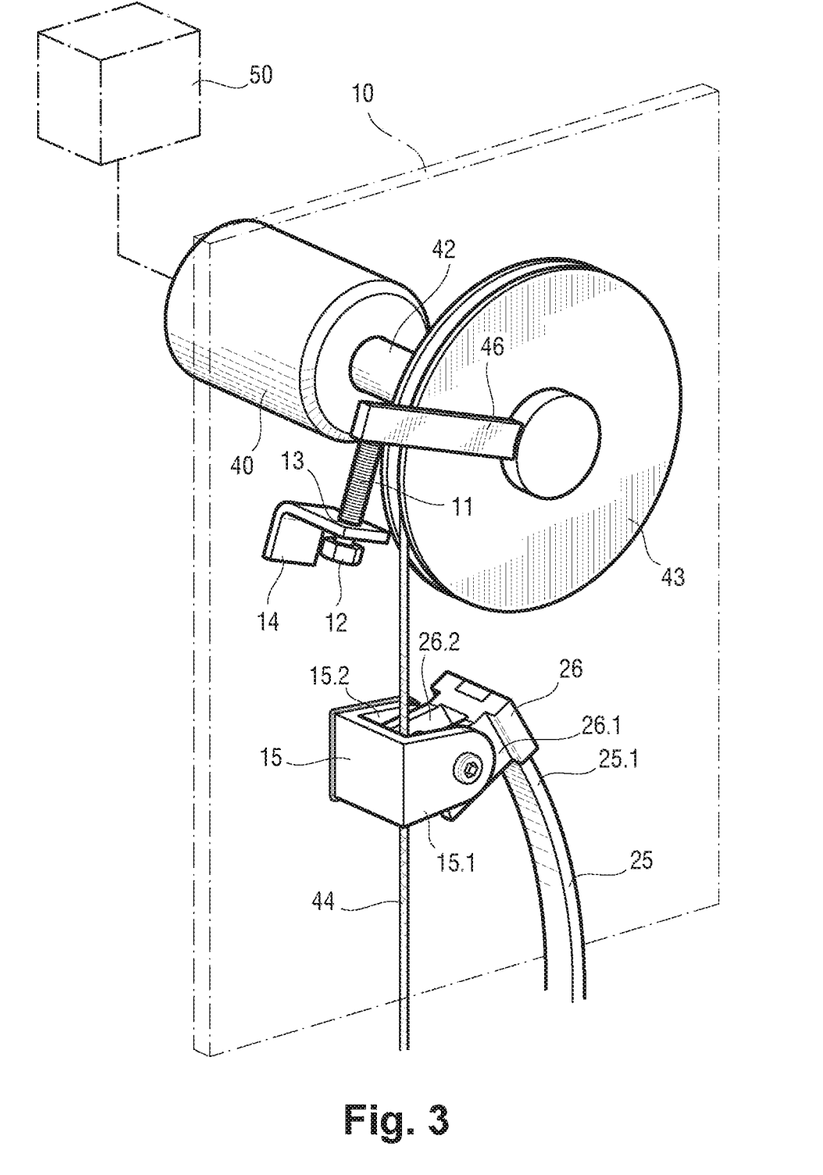
FIG. 3 is a schematic perspective view showing details of the first embodiment of the exoskeleton according to the invention.

With reference to FIG. 3, the pulley 43 comprises a stop 46 for abutting the end 11 of a screw 12, which is engaged in a thread 13 formed in a bracket 14 rigidly connected to the pelvis segment 10.

The geared motor 40 is connected to a command and control unit 50 carried by the pelvis segment 10. As can be seen in FIG. 1, the cable 44 is located in a plane comprising the axis of articulation of the leg segment on the pelvis segment 10, so as not to create a parasitic torque on the hip segment 10. However, it may be of interest to have the cable run behind the point of rotation of the hip if it is desired to create a return torque for the back (especially in order to assist the bending of the user's back and thus to protect the lumbar vertebrae). It is possible to completely eliminate the parasitic torques in abduction by running the cable 44 through the center of rotation of the articulation of the leg segment 20 on the pelvis segment 10. Such an embodiment is shown in FIG. 3. The first end 25.1 of the leaf spring 25 comprises a first clevis 26 having two first lugs 26.1 and 26.1, which cooperate respectively in rotation with two second lugs 15.1 and 15.2 of a second clevis 15 rigidly connected to the pelvis segment 10. The first lugs 26.1 and 26.2 bear against inner faces of the second lugs 15.1 and 15.2, and the cable 44 extends between the two first clevises 26.1 and 26.2.

The pelvis segment 10 comprises an interface 60 for carrying a payload 61.

During operation and before the exoskeleton 1 is fitted in place on the user 100, the stop 46 and/or the length of the cable 44 are/is adjusted such that the distance d separating the pelvis segment 10 from the foot segment 30 is substantially equal to the distance separating the pelvis 110 from the foot 130 of the user 100. As apparent from FIG. 1, for example, when the distance d is shortened, the force from the leaf spring that opposes the movement of the ends of the leg segment toward each other increases. The leaf spring 25 is then pretensioned, even in the absence of a torque exerted by the geared motor 40 on the pulley 43. Once the exoskeleton 1 is connected to the user 100, a load 61 is fixed on the interface 60. The leaf spring 25 is dimensioned so as not to bend under the weight of the exoskeleton 1 plus the weight of the load 61. Depending on the characteristics of the leaf spring 25 (material, cross section), the load supported by the user 100, and taken up here by his leg 120, can vary from 0% (total assistance) to 100% (no assistance) of the total load, which comprises the inherent weight PE of the exoskeleton 1 and the weight of the load 61.

With the user standing upright, the leaf spring 25 takes up vertical forces to which the exoskeleton 1 is subjected. A minimum amount of power is consumed by the exoskeleton 1 in this configuration since, with the pulley 43 being against its abutment, the geared motor 40 does not supply a torque and consumes little power (or none at all). When the user 100 wishes to walk, he transfers part of the load exerted on his foot 130 to his other foot and starts to lift his heel.

The encoder 34 measures a change in the relative angular position of the exoskeleton foot with respect to the leaf spring 25 and transmits this information to the control unit 50. The unit 50 analyzes this measurement and then commands a rotation of the geared motor 40, which acts on the cable 44 in order to adapt the length of deployed cable to the movement of the foot segment 30. Thus, the control unit 50 dictates the distance d on the basis of the measurement of the attitude of the leg 122 and ensures a variation of the distance d while the leg 120 of the user is in the swing phase (lifted from the ground). For example, the torque reference value can correspond to a tensile load of about three hundred Newton applied by the geared motor 40 to the cable 44, which corresponds to a tension of the leaf spring 25 making it possible to support the weight of the exoskeleton and an additional load of twenty kilograms when the leg 22 of the exoskeleton 1 is lifted. During the swing phase of the foot 130 of the user, the control unit 50 dictates the distance d as a function of the position of the foot 130 of the user 100 in such a way that no force is applied by the leaf spring 25 to the foot 130 of the user 100 during its movement remains lower.

Thus, a lower-limb exoskeleton 1 is obtained which consumes a tiny amount of power, if indeed any, in the stance phase, and of which the power consumption in the walking phase is reduced, since the geared motor 40 consumes power exclusively when the leg 120 is not straight (that is to say only in a part of the walking phase during which the leg 120 is in the air).

The elements that are identical or similar to those described above will bear an identical reference number in the following description of the second, third, fourth and fifth embodiments of the invention.

Figure 4:
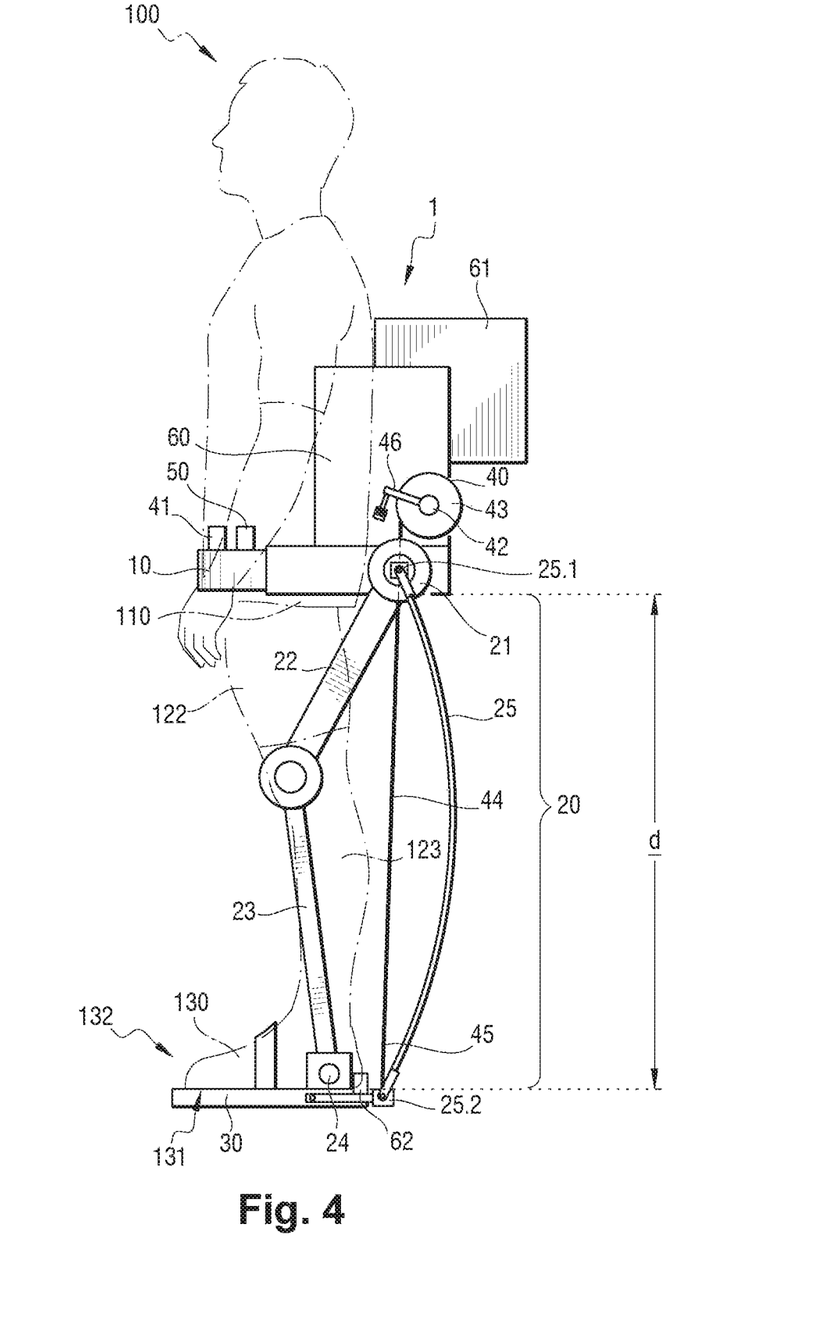
FIG. 4 is a schematic profile view of a user wearing a second embodiment of the lower-limb exoskeleton according to the invention.

With reference to FIG. 4 and according to a second embodiment of the invention, the foot segment 30 comprises a highly sensitive linear potentiometric sensor on the foot segment 30 of the exoskeleton 1 and connected to the unit 50.

This sensor 62 measures the distance that separates the first element 31 from the second element 32 of foot segment 30. From this distance it is possible to deduce the attitude (angular position and length) of the leg 122, hence the distance separating the pelvis segment 10 from the foot segment 30. The intention of the user 100 to leave the stance phase in order to walk is detected when the sensor 62 measures a movement. This measurement is transmitted to the unit 50, which then controls the geared motor 40.

This sensor 62 can also be composed of strain gauges in such a way as to measure the strain between the foot 30 and the ankle 25.2 (the distance d is then controlled on the basis of the strain measured, with a zero setpoint or with a slight offset).

Figure 5:
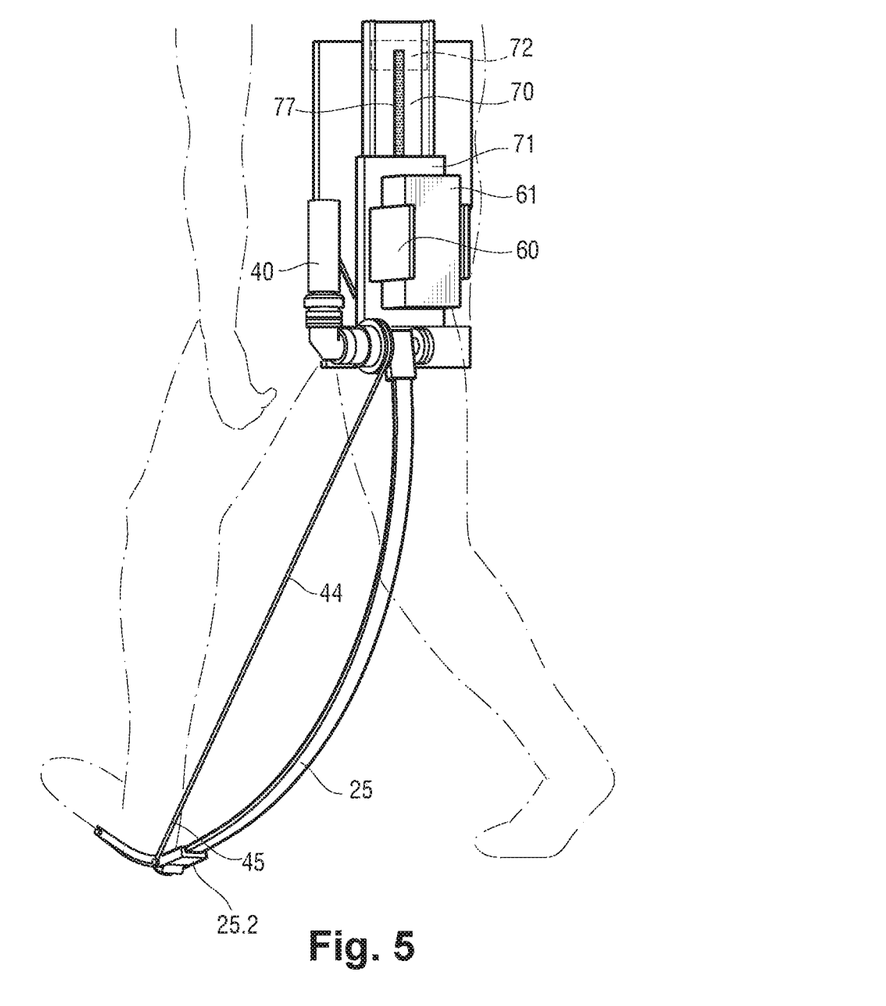
FIG. 5 is a schematic perspective view of a user wearing a third embodiment of the lower-limb exoskeleton according to the invention.

With reference to FIG. 5 and according to a third embodiment of the invention, the pelvis segment 10 comprises a ball-type slideway 70 oriented substantially vertically when the exoskeleton 1 rests on a horizontal ground surface. A first carriage 71 is mounted freely, or with a weight compensation spring, to slide on the slideway 70. The first carriage 71 carries the interface 60, to which the load 61 is connected, and also the geared motor 40, the pulley 43, its stop 46, the screw 12 and the bracket 14. Other elements of the pelvis segment 10 can also be carried by the first carriage 71, for example the command and control unit 50 and/or the electric accumulators 41.

The functioning of the exoskeleton 1 is identical to what has been described above. The set-up of the geared motor 40 and of the interface 60 for carrying the load 61 permits a free flexion travel of the legs (making it possible, for example, to crouch down) free, during which it is not necessary to adjust the geared motor 40, which again makes it possible to limit the power consumption of the exoskeleton 1. This can prove particularly useful in the case of an exoskeleton for assisting in tasks that require brief and frequent bending of the legs, for example for picking things up from the ground (items of rubbish, crops) or for raking.

An upper stop 72 can also be provided in order to limit the flexion travel; this travel can also be managed with the aid of the encoder 34 and the control unit 50.

Figure 6:
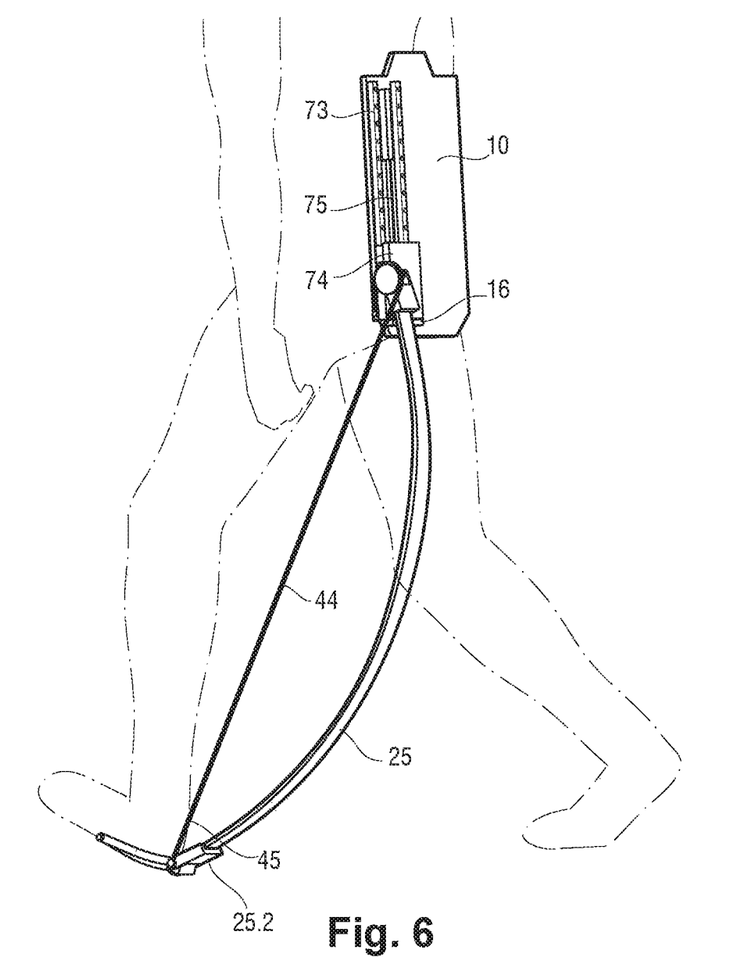
FIG. 6 is a schematic perspective view of a user wearing a fourth embodiment of the lower-limb exoskeleton according to the invention.
Figure 7:
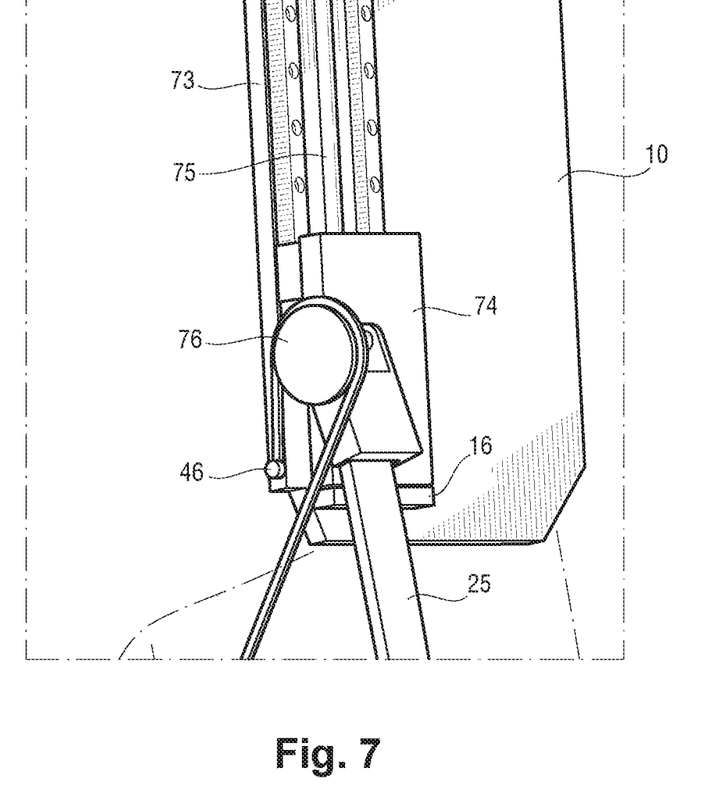
FIG. 7 is a schematic perspective view showing details of the fourth embodiment of the invention.

With reference to FIGS. 6 and 7 and according to a fourth embodiment of the invention, the pelvis segment 10 comprises a ball-type slideway 73 oriented substantially vertically when the exoskeleton rests on a horizontal ground surface. A second carriage 74 is mounted to slide on the slideway 73. An electric actuator 75, connected electrically to the unit 50, extends between the pelvis segment 10 and the second carriage 74 in such a way that a retraction of the actuator 75 causes a translation of the second carriage 74, which moves the latter away from the first end 21 of the leg segment 20, which end 21 is articulated on the pelvis segment 10. As can be seen in FIG. 6, the first end 45 of the cable 44 is connected to the second end 25.2 of the leaf spring 25 and, as can be seen in FIG. 7, the second end 46 of the cable 44 is coupled to the pelvis segment 10, here to a point of the slideway 73. The second carriage 74 carries an idler pulley 76 about which the cable 44 winds. Thus, a movement of the second carriage 74 makes it possible to act on the deployed length of cable 44 and therefore on the distance d separating the pelvis segment 10 from the foot segment 30. As can be seen in FIG. 7, a lower stop 16, fixed to the pelvis 10, makes it possible to limit the downward travel of the second carriage 74 and thereby limit the maximum length of the distance d, while placing the actuator 75 in a rest position (no force taken up by the actuator 75, hence no power consumption).

When the user 100 wishes to walk, he transfers some of the load exerted on his foot 130 to his other foot and begins to lift his heel.

The encoder 34 measures a change in the relative angular position of the foot of the exoskeleton with respect to the leaf spring 25 and transmits this information to the control unit 50. The unit 50 analyzes this measurement and then commands a retraction of the actuator 75 which, moving the second carriage 74, pulls on the cable 44 in order to adapt the length of deployed cable 44 to the movement of the foot segment 30. Thus, the control unit 50 dictates the distance (d) on the basis of the measurement of the attitude of the leg 122 and ensures a variation of the distance d while it is in the swing phase (lifted from the ground).

The third and fourth embodiments can be combined, and the first carriage 71, which is mounted freely, can receive the second carriage 74, which is controlled.

Figure 8:
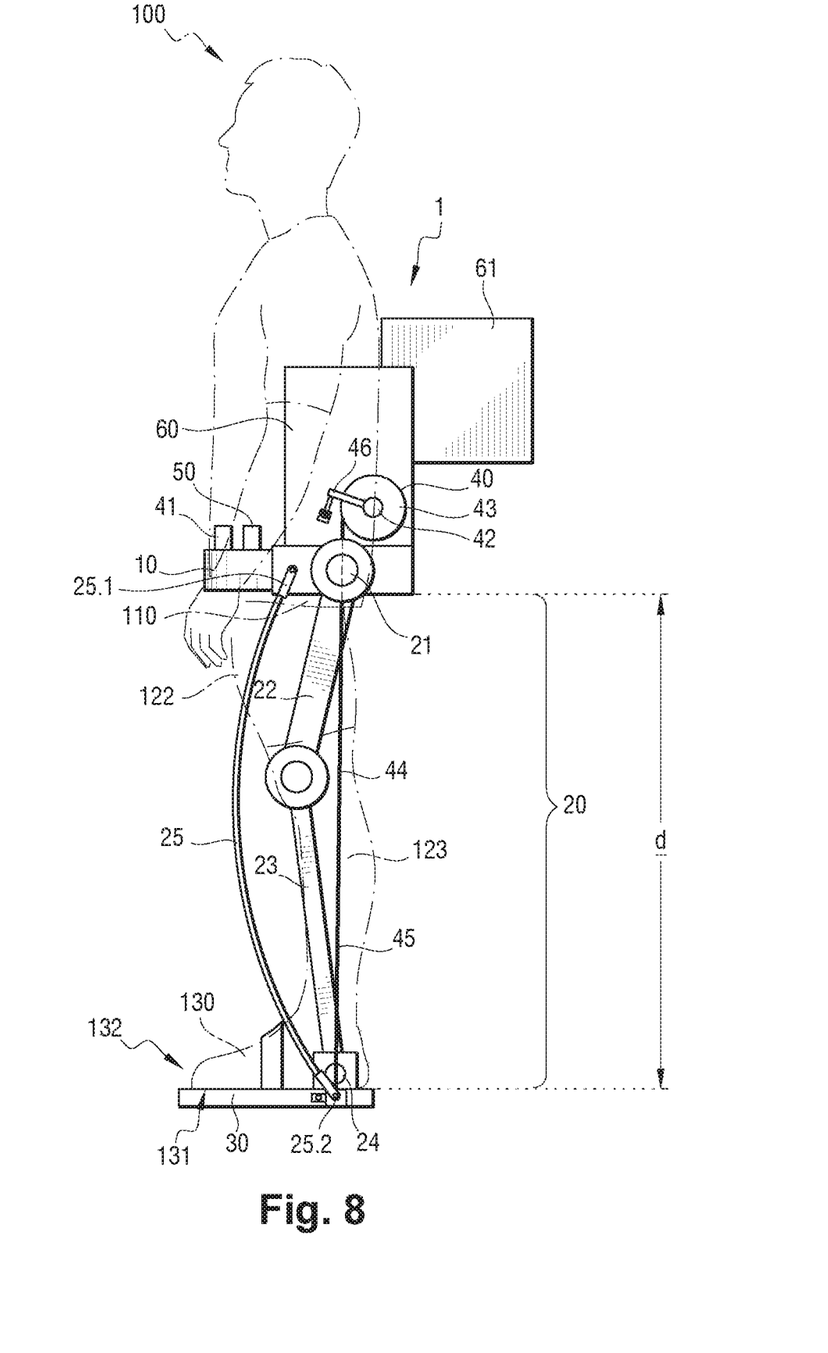
FIG. 8 is a schematic profile view of a user wearing a fifth embodiment of the lower-limb exoskeleton according to the invention.

FIG. 8 shows a fifth embodiment, in which the leaf spring 25 is positioned in front of the leg 22 of the exoskeleton 1. The curvature of the leaf spring 25 is here oriented forward, although it can also be oriented rearward.

Figure 9:
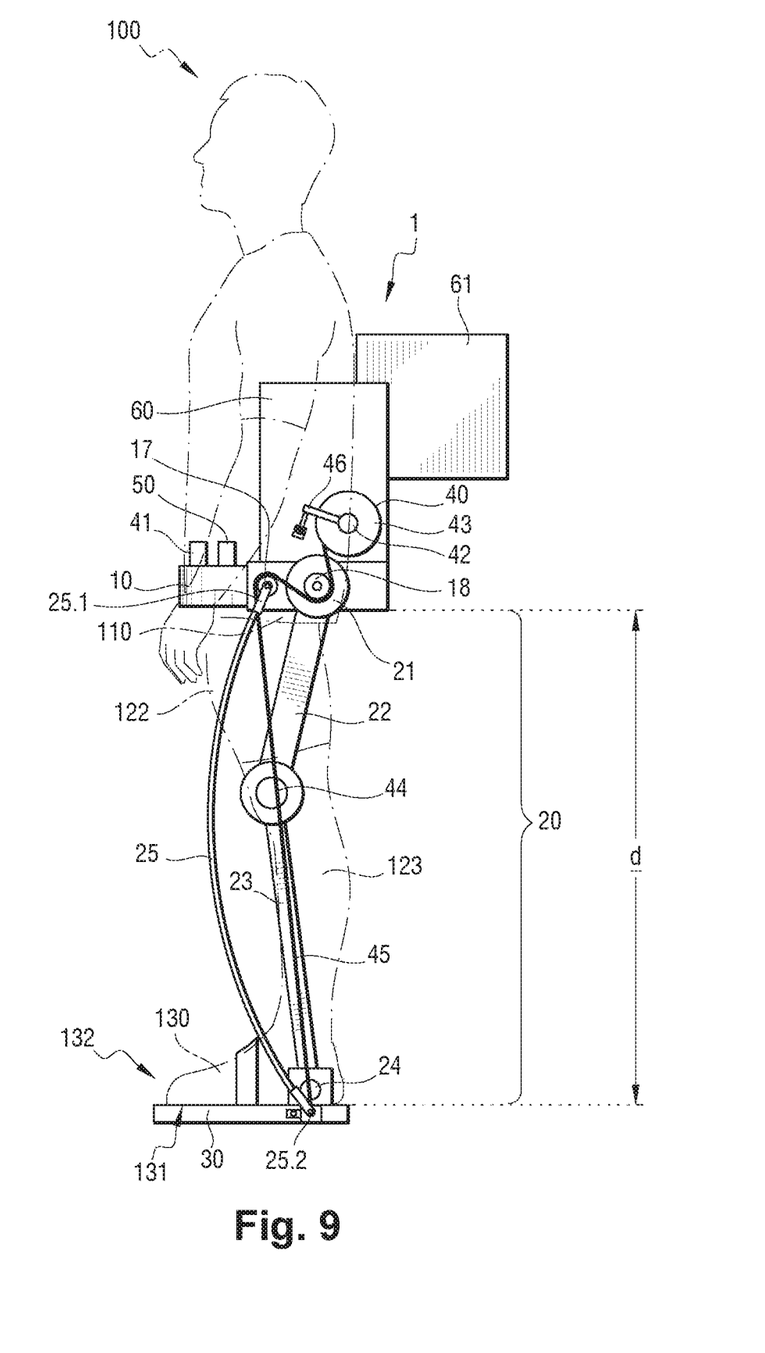
FIG. 9 is a schematic profile view of a user wearing a sixth embodiment of the lower-limb exoskeleton according to the invention.

In a sixth particular embodiment, shown in FIG. 9, the cable 44 winds on an upper portion of a first idler deflection pulley 17 and thereafter winds on a lower portion of a second idler deflection pulley 18. The cable 44 then winds about the winding pulley 43. The first and second idler deflection pulleys 17 and 18 make it possible to move the point of traction of the cable 44 on the pelvis segment 10 in such a way as to control the torque caused by the traction of the cable 44 on the pelvis segment 10 and on the user 100. The first and second idler deflection pulleys 17 and 18 will also be able to be mounted elastically so as to automatically take up the slack in the cable 44 in the manner of a preloaded tensioning roller. This type of device is particularly useful in situations where the user 100 wishes to crouch down and compresses the leaf spring 25, causing a slackening of the cable 44 that it is necessary to compensate.

The slack in the cable can also be taken up electromechanically, for example with the aid of a torque sensor 47 (not shown) positioned on the output of the geared motor 40. The sensor 47 is connected to the control unit 50, which controls the geared motor 40 in such a way that the latter applies a minimum torque Cmin to the winding pulley 43 and thereby ensures a minimum tension Tmin of the cable 44. Thus, when the user 100 wishes to crouch down, his own weight exerts a pressure on the leaf spring 25, the effect of which is to reduce the distance d and therefore the tension in the cable 44, the torque exerted on the output shaft 42 of the geared motor 43 falls, and the control unit 50 commands a rotation of the geared motor 40 in order to wind the cable 44 until the torque applied to the output pulley 43 by the geared motor 40 reaches the value of the minimum torque Cmin, thus bringing the tension of the cable 44 to the value Tmin, avoiding slack in the cable 44.

In the third embodiment of the invention, the device for taking up slack in the cable comprises a movement sensor 77 (here a potentiometric sensor) which detects movement of the carriage 71 and is connected to the control unit 50, which then commands a rotation of the geared motor 40 in order to wind the cable 44, the amplitude of the rotation of the geared motor 40 depending on the movement of the carriage 71 measured by the movement sensor 77. The measurement of the movement of the carriage 71 makes it possible to ascertain the intention of the user 100 to crouch down.

Figure 10:
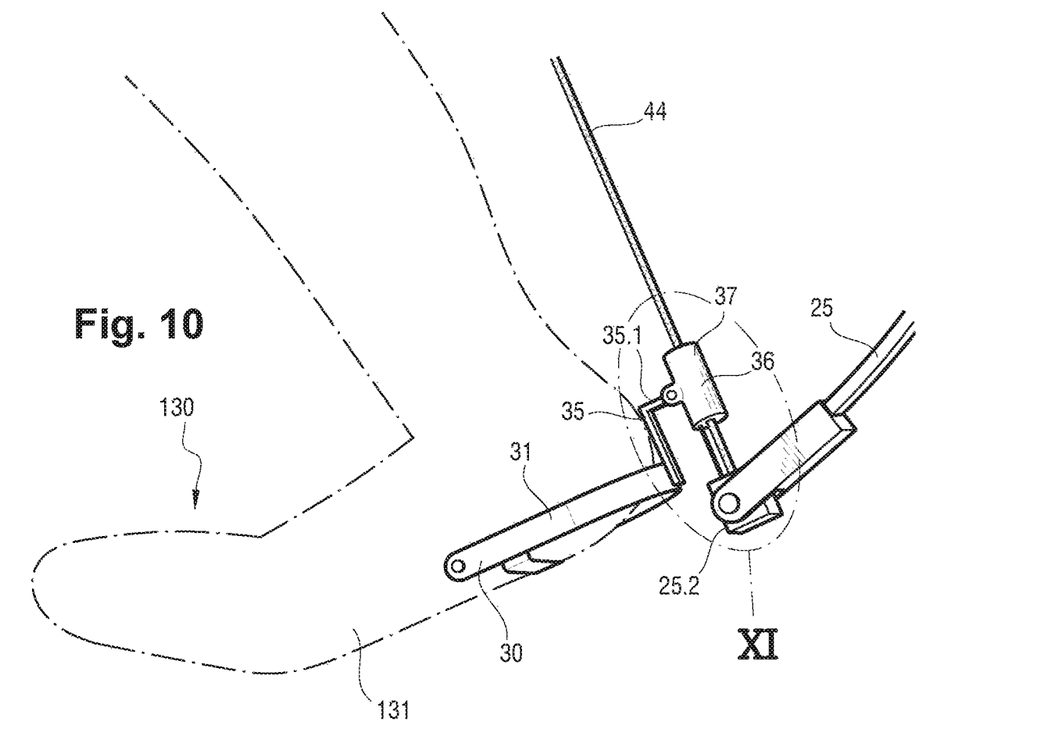
FIG. 10 is a schematic view of details of a seventh embodiment of the exoskeleton according to the invention.
Figure 11:
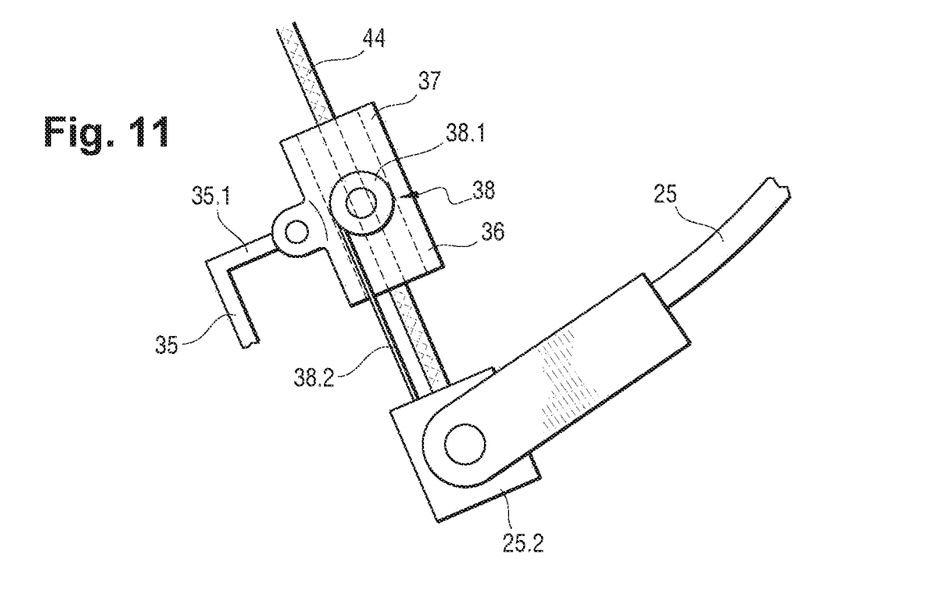
FIG. 11 is a schematic view of a detail from FIG. 10.

According to a seventh embodiment of the invention and with reference to FIG. 10, the foot segment 30 is here coincident with the sole 131 of the shoe 132 of the user 100 and comprises a first element 31, of foot segment 30, that is rigidly connected to the foot 130 of the user and has substantially the shape of a horseshoe and extends around the heel of the shoe 132. The first element 31 comprises a bracket 35, of which the distal end 35.1 is connected by a hinge 36 to a cylindrical slide 37 through which the cable 44 passes. The slide 37 comprises a resistance rotary potentiometer 38, of which the rotor 38.1 is provided with means for elastic return to its initial position, which corresponds to a resistance equal to zero, measured at its terminals. A wire 38.2 connects the second end 25.2 of the leaf spring 25 to the rotor 38.1. The rotary potentiometer 38 is connected to the control unit 50. Depending on the resistance measured at the terminals of the rotary potentiometer 38, the control unit 50 estimates the relative angular position of the first element 31 of foot segment 30 and of the leaf spring 25. From this angular position it is possible to deduce the attitude (estimation of the length) of the leg 122 and therefore the distance separating the pelvis segment 10 from the foot segment 30. Controlling the distance d on the basis of this angular position makes it possible to follow the foot of the user 100 when the leg 122 is in the swing phase (lifted from the ground).

Of course, the invention is not limited to the described embodiments and instead encompasses any variant covered by the field of the invention as defined by the claims.

In particular,

- although the exoskeleton here has only a single lower limb, the invention also applies to an exoskeleton provided with two lower limbs;
- although the pelvis, thigh, tibia and foot segments are here connected to the user by straps, the invention also applies to other means of fastening the segments of the exoskeleton to the user, for example rigid cylindrical elements or specific garments rigidly joined to the segments of the exoskeleton;
- although the thigh and tibia segments are here connected to the user, the invention also applies to thigh or tibia segments that are independent of the user;
- although the leg segment here comprises a thigh segment articulated on a tibia segment, the invention also applies to a leg segment which is without thigh and tibia segments and which would comprise only the leaf spring and the cable (the leaf spring then serving as a structural component);
- although the leg segment here comprises a leaf spring, the invention also applies to other types of spring elements, for example a stack of Belleville washers, an elastomeric element, a gas spring, a coil spring (for example on the knee), a buffer spring, a deformable parallelogram structure, or a block of elastic cables;
- although the lower limb here comprises a geared motor and a pulley providing the traction on a cable, the invention also applies to other means of varying the distance separating the ends of the leg segment, for example a block moved by a ball screw or a rack;
- although an electrical actuator here causes the translation of the carriage relative to the pelvis segment, the invention also applies to other types of actuators for moving the carriage relative to the pelvis segment, for example a screw/nut assembly, one of the components of which is motorized, a toothed belt drive, a geared motor which is rigidly connected to the carriage and of which the output shaft engages with a rack rigidly connected to the slideway;
- although the cable here is connected to the foot segment, the invention also applies to other points of connection of the cable to the exoskeleton that are able to bring about a variation of the distance separating the ends of the leg segment, for example a connection to the ankle, the tibia segment or the thigh segment;
- although the actuation system is here fixed to the pelvis segment, the invention also applies to other points for fixing the actuation system that are able to bring about a variation of the distance separating the ends of the leg segment, for example fixing to the hip, the top of the leg, the tibia segment or the thigh segment;
- although the pulley here comprises a stop cooperating with a nut, the invention also applies to other devices for pretensioning the spring element and to other locations on the chain of actuation;
- although the foot segment here comprises a linear or rotary potentiometric sensor on the foot or ankle, the invention also applies to other types of sensor for detecting the intention to walk, for example a pressure sensor, a force sensor or a rotation sensor linked to an articulation of the ankle segment, or even contact-free measurement systems (for example: optical sensor, magnetic sensor, etc.);
- although the leaf spring here is positioned to the rear of the leg of the user, the invention also applies to other set-ups of the leaf spring, for example a leaf spring positioned to the front of the leg of the user (curvature toward the front), or on the outer side of the legs of the user;
- although the geared motor here comprises a pulley for winding a cable, the invention also applies to other means of varying the distance separating the ends of the leg segment, for example a wheel cooperating with a flexible force-transmitting element, for example a toothed belt or a chain;
- although the articulation of the leg segment on the pelvis segment here comprises two first lugs of a clevis rigidly connected to the leaf spring, which cooperate in rotation with two second lugs of a clevis rigidly connected to the pelvis segment, the invention also applies to other means of articulation of the leg segment on the pelvis segment that allow the cable to pass through the center of the articulation, for example a perforated shaft;
- although the pelvis, the motors, the batteries and the controller are here at the back of the user, the invention applies to the case where the exoskeleton is worn the other way round, that is to say with the pelvis in front of the user;
- although the lower limb here comprises a geared motor and a pulley providing the traction on a cable, the invention also applies to other means of varying the distance separating the ends of the leg segment, for example an SPC (supercoiled polymer) actuator, in which the variation of the length of the cable is obtained by heating the latter through application of an electrical voltage to its terminals;
- although the lower limb here comprises a potentiometric movement sensor detecting the movement of the carriage, the invention also applies to other types of sensors that detect crouching, for example an inductive, capacitive or optical movement sensor for detecting movement of a carriage, or, in the case of a lower-limb exoskeleton without carriage, an inertial unit;

although the foot segment here is coincident with the sole of the shoe of the user, the invention also applies to other configurations of the foot segment of the robot, for example a platform coupled by strapping, adhesive bonding or screwing to the foot (or the shoe) of the user;

although the means for taking up slack in the cable here comprise a torque sensor positioned on the output of the geared motor, the invention also applies to means for taking up slack in the cable that comprise a slackness sensor carrying out a cable slack measurement directly on the cable;

although the potentiometer here is a resistance rotary potentiometer, the invention also applies to other types of sensors for detecting the foot position, for example a linear potentiometer, an inductive sensor, ultrasound sensor or capacitive sensor.

The leaf spring can be articulated on the foot segment and/or the pelvis segment at points identical to or different from the points of articulation of the leg segment on the foot and/or hip segment.

Advantageously, the cable 44 can be lined by a second cable, which is active or inactive (i.e. does or does not take up some of the tension of the cable 44) and which contributes to the operating safety and prevents the consequences of accidental rupture of the cable 44.

Not all the articulations of the segments of the exoskeleton have been described, and they can be adapted to the specific use of the exoskeleton. For example, it will be possible for the hip flexions to be either actuated or left free or else coupled, depending on the circumstances.

Similarly, depending on the circumstances, it will be possible for the hip abduction articulations to be actuated, left free, or stressed (bilateral or unilateral abutment, with or without spring). The same applies to the ankle articulations.

The invention claimed is:

1. A lower limb (1) of an ambulatory exoskeleton, wherein the lower limb comprises:
   a pelvis segment,
   a leg segment, and
   a foot segment;
   wherein the leg segment is articulated at its first end at the pelvis segment and at its second end at the foot segment, and
   wherein the leg segment comprises a spring element for exerting a force that opposes a movement of the ends of the leg segment toward each other, and means for varying the distance (d) separating the first end and the second end of the leg segment in order to apply a force counter to that of the spring element,
   wherein, when the means for varying the distance shortens the distance, the force that opposed the movement of the ends of the leg segment toward each other increased, and wherein the means for varying the distance (d) is located on the pelvis segment, and
   wherein the means for varying the distance (d) comprise a device for pretensioning the spring element.

2. The lower limb of an ambulatory exoskeleton as claimed in claim 1, in which the means for varying the distance (d) comprise a cable.

3. The lower limb of an ambulatory exoskeleton as claimed in claim 2, in which the cable is coupled to a point of articulation of the leg segment on the foot segment, or on a point of the leg segment.

4. The lower limb of an ambulatory exoskeleton as claimed in claim 2, in which the cable extends between the pelvis segment and the foot segment.

5. The lower limb of an ambulatory exoskeleton as claimed in claim 2, in which the means for varying the distance (d) comprise a geared motor and a winding pulley for winding and unwinding the cable.

6. The lower limb of an ambulatory exoskeleton as claimed in claim 2, comprising a slackness sensor configured to measure slack in the cable.

7. The lower limb of an ambulatory exoskeleton as claimed in claim 1, in which the means for varying the distance (d) comprise a first carriage sliding relative to the pelvis segment.

8. The lower limb of an ambulatory exoskeleton as claimed in claim 7, comprising an actuator for moving the first carriage relative to the pelvis segment.

9. The lower limb of an ambulatory exoskeleton as claimed in claim 1, in which the means for varying the distance (d) are controlled by a foot position sensor rigidly connected to the foot segment.

10. The lower limb of an ambulatory exoskeleton as claimed in claim 9, in which the foot position sensor comprises a potentiometer functionally connected to the leg segment.

11. The lower limb of an ambulatory exoskeleton as claimed in claim 1, in which the spring element is a leaf spring.

12. The lower limb of an ambulatory exoskeleton as claimed in claim 11, in which the leaf spring is positioned behind the leg of a user wearing the exoskeleton.

13. The lower limb of an ambulatory exoskeleton as claimed in claim 11, in which the leaf spring is positioned in front of the leg of a user wearing the exoskeleton.

14. The lower limb of an ambulatory exoskeleton as claimed in claim 1, comprising a crouch sensor.

15. The lower limb of an ambulatory exoskeleton as claimed in claim 1, in which the foot segment comprises a shoe sole intended to receive the foot of a user.

* * * * *